XR 3,732,367

TX3074T

United States
Teranishi et al.

[11] 3,732,367
[45] May 8, 1973

[54] APPARATUS FOR FACSIMILE USING A PRISM-SHAPED FIBER OPTICS

[75] Inventors: Akio Teranishi; Eiichi Miyazaki, both of Kadoma, Japan

[73] Assignee: Matsushita Electric Industrial Company, Limited, Kadoma City, Osaka, Japan

[22] Filed: Apr. 7, 1972

[21] Appl. No.: 242,009

Related U.S. Application Data

[63] Continuation-in-part of Ser. No. 97,064, Dec. 15, 1970, abandoned.

[52] U.S. Cl. ....178/6.8, 178/DIG. 2, 250/227, 313/92 LF, 350/96 B
[51] Int. Cl. ....H04n 5/68, H04n 5/84
[58] Field of Search ....178/6.8, DIG. 2; 313/92 LF; 250/227; 350/96 B

[56] References Cited

UNITED STATES PATENTS

| | | | |
|---|---|---|---|
| 3,198,881 | 8/1965 | Knocklein | 313/92 LF |
| 3,581,102 | 5/1971 | Nagao | 250/227 |
| 2,537,173 | 1/1951 | Szegho | 178/6.8 |

*Primary Examiner*—Robert L. Griffin
*Assistant Examiner*—Joseph A. Orsino, Jr.
*Attorney*—Donal E. McCarthy et al.

[57] ABSTRACT

A read-in and read-out apparatus for a facsimile system which comprises a cathode ray tube having a prism-shaped fiber optics faceplate, feeding means for advancing an information medium closely adjacent to one of the slanting end faces of the fiber optics faceplate, and control means for controlling the cathode ray tube to emit a flying-spot from the one of the slanting end faces in read-in operation and emit a flying-spot from the other slanting end face in read-out operation.

1 Claim, 7 Drawing Figures

3732367
NO OR CLASSIF

Fig. 1a
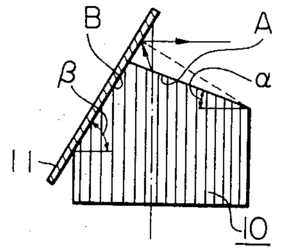
Fig. 1b
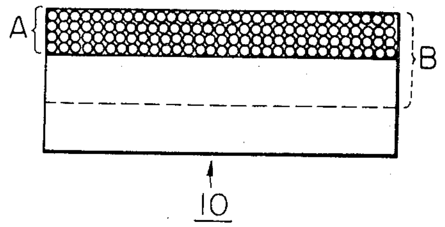
Fig. 3
Fig. 2
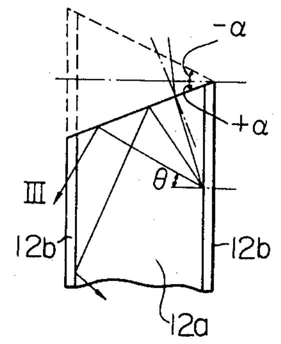
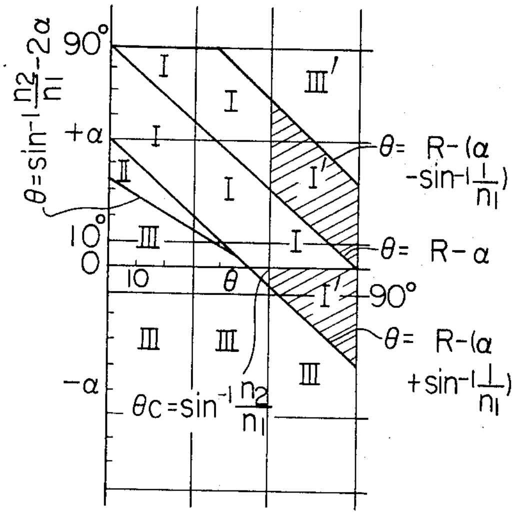

APPARATUS FOR FACSIMILE USING A PRISM-SHAPED FIBER OPTICS

This application is a continuation-in-part application of the application Ser. No. 97,064 filed on Dec. 15, 1970 and now abandoned.

The present invention relates to an apparatus for use in a facsimile system and more particularly to an apparatus using a cathode ray tube having a prism-shaped fiber optics faceplate.

Various facsimile system are known in the art which are used for transmission and reception of optical information on an information medium. In one system, such as disclosed in U.S. Pat. No. 3,198,881 to Knocklein, a cathode ray tube having a fiber optics faceplate is utilized as a scanning means. One prominent drawback of this system is its inability of picking up information on an opaque medium.

Another system is disclosed in U.S. Pat. No. 3,255,308 to Walkup, which utilizes a cathode ray pin tube as a scanning means. It is pointed out that in the system of this type, the type of the information medium is limited to a web of dielectric material alone.

Accordingly, it is an object of the present invention to provide a read-in and read-out apparatus which can readily permitted to be in either read-in or read-out operation through a simple operation.

It is another object to provide a read-in and read-out apparatus which can operate with an increased resolution power.

It is another object to provide a read-in and read-out apparatus which can efficiently pick up or transmit light rays.

Further objects of the invention will become apparent from the following detailed description taken in conjunction with the accompanying drawings in which:

FIGS. 1-*a* and 1-*b* are side elevations of a prism-shaped fiber optics element which is utilized as a faceplate of a cathode ray tube of the apparatus of the present invention;

FIG. 2 is a view for diagrammatic analysis of the light advancing in a single optical fiber;

FIG. 3 is a graphical representation corresponding to FIG. 2;

Corresponding parts are similarly numbered in the views.

Figure 4:
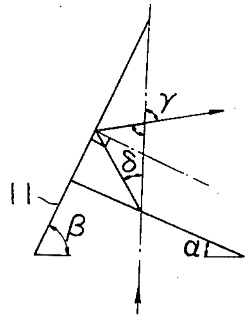
FIG. 4 is an explanatory view of the relative positions of the fiber optics faceplate and the information medium placed on one end face of the fiber optics faceplate.

Referring now to the drawings and more specifically to FIG. 1 thereof, there is shown a fiber optics element 10 which made up of a number of optical fibers. As shown, the fiber optics element 10 has provided at its one end portion two adjacent end faces A and B that are angled at $\alpha$ and $\beta$, respectively, from the place perpendicular to the axes of the optical fibers. Designated with 11 is a document or an information medium to which the light leaving the fiber optics element 10 is to be projected, which copy is placed direct on or positioned in close proximity to the face B of the element 10 with its portions extending from the edges of the face B. The angle $\alpha$ is so determined that the majority of the light within the optical fiber is allowed out of the tips of them, while the angle $\beta$ is determined in accordance with the desired direction of the light reflected from the document, i.e., depending upon whether the outgoing light is reflected in a direction substantially rectangular to the axes of the fibers or is reflected in any other direction.

It may be mentioned that, although the face B confronting the document 11 is herein illustrated to be a uniplanar slope relative to a perpendicular to the axes of the optical fiber, the face may be configured otherwise, say, as a curved or concave face by way of example, inasmuch as the document 11 in situ makes an angle $\beta$ relative to the plane perpendicular to the axes of the optical fibers plane of the element 10.

Now, FIG. 2 is presented to show how the angle $\alpha$ should be determined. Here, only one optical fiber 12 is exemplified for simplicity of illustration. As shown, the optical fiber 12 is formed of a core 12*a* with a refractive index of $n_1$ and a cladding 12*b* with a refractive index of $n_2$ which is smaller than $n_1$. The light, as it advances within the core 12*a*, is repeatedly totally reflected from the boundary with the cladding 12*b*. If the fiber 12 is assumed to terminate at an angle $\alpha$ to the plane normal to the axis of the fiber 12, then the light lastly reflected from the boundary of the core at a given angle $\theta$ will advance in three different paths: a first portion I of the light admitted out of the cores through the end plane thereof, a second portion II totally reflected backwardly from the end plane, and a third portion III released outwardly through the wall of the cladding after total reflection from the end plane. It is to be noted that there is another light which is reflected from the other wall and is admitted out of the end plane of the fiber tip. Thus, if the light is assumed to be lastly reflected from the boundary of the core at the very point illustrated before it teaches the end plane, taking into consideration the light reflected from the other wall, it may well be considered that the end plane of the fiber 12 is angled either at $+\alpha$ or at $-\alpha$. If the angle $+\alpha$ is to be taken into consideration, the range of the angle $\theta$ for the above mentioned three portions of the light will be given by the following expressions:

$\theta \geqq \angle R-(\alpha+\sin^{-1}(1/n_1))$, for the portion I, $\sin^{-1}(n_2/n_1)-2\alpha \leqq \theta \leqq \angle R-(\alpha+\sin^{-1}(1/n_1))$, for the portion II, $\theta \leqq \sin^{-1}(n_2/n_1)-2\alpha$, for the portion III.

It will be understood that similar expressions can be obtained where the angle $-\alpha$ is taken into account.

If the angle $+\alpha$ increases to a certain extent, then there will come into existence a fourth portion III' of the light, which is admitted out of the fiber through the wall of the cladding 12*b*. Here, the range of the angle $\theta$ is given by:

$\theta \geqq \angle R-(\alpha-\sin^{-1}(1/n_1))$

Now, in order that the majority of the outgoing light be directed toward the portion of the document which extends from the edge of the element 10, the angle $\theta$ must be in the range expressed as:

$\theta \geqq \angle R-\alpha$

This particular portion of the outgoing light is herein denoted as the portion I'.

It will readily be understood that the light which advances within the core toward the fiber tip is repeatedly totally reflected from the boundary of the core at the angle defined by:

$\theta \geqq \sin^{-1}(n_2/n_1)$

Thus the portion of the light which the present invention proposes to utilize as advantageous is the light falling within the region indicated by I' in FIG. 3, which is the graphical representation of the above mathematical expressions. Therefore, a preferred range of the angle $\alpha$ is given by:

$0 < \alpha \leqq \sin^{-1}(1/n_1)$

The angle $\alpha$ is, as will be appreciated from the foregoing discussion, determined in such a manner as to meet the requirements of (1) permitting the major portion of the input light to be admitted from the individual fibers, (2) minimizing the diffusion of the light emitted from the fibers toward the document, and (3) guiding the light reflected from the document in a desired direction so as not to let the reflected light back into the fibers.

FIG. 4 is a view showing how the angle $\beta$ should be determined, wherein consideration is simply paid to that portion of the light which has advanced within a fiber in a direction parallel to the axis of the fiber because such portion of the light accounts for the majority of the output light.

The end of the fiber tip being cut at an angle $\alpha$ to the plane traversing the axis of the fiber, the light leaving the fiber tip is refracted at the end plane of the fiber. The angle $\delta$ at which the outgoing light is refracted can be defined as:

$\delta = \sin^{-1}(n_1 \cdot \sin\alpha) - \alpha$

If, on the other hand, the light reflected from the document 11 is directed at an angle of $\gamma$ to the axis of the fiber, then the angle $\beta$ can be obtained from the equation:

$\beta = \angle R + (\delta - \gamma/2)$ where $\delta = \sin^{-1}(n_1 \cdot \sin\alpha) - \alpha$.

Now, let us consider for comparison's sake two representative cases of deriving the light reflected from the document in a direction substantially rectangular to the fiber axis, in one of which the angle $\alpha$ is assumed to be zero degrees and in the other it is assumed to fall within the region I' in FIG. 3.

When diffused light is incident on the input end of an optical fiber whose output end is angled at zero degrees to the plane traversing the fiber axis and if the document is placed on a plane parallel to the plane of the output end, the output light from the fiber spreads in a substantially circular from on the document, the size of the circle varying with the so-called numerical aperture of the fiber used. If, however, the document is placed at a certain angle to the plane of the output end of the fiber for the purpose of guiding the light reflected from the document in a specific direction, then the light projected to the document from the output end of the fiber spreads in an oval form on the document.

When, in contrast, an angle $\alpha$ falling within the range indirected by region I' in FIG. 3 is provided at the output end of the fiber, the outgoing light from the fiber tip has a higher directivity for $\delta$ direction as compared with the case where $\alpha = 0$ and, if the reflected light is to be oriented in the same direction as in the case where $\alpha = 0$, the angle which the document makes with respect to the axis of the light incident on the document decreases accordingly. This will mean that light projected to the document spreads thereon to a lesser area as compared with the case where $\alpha = 0$.

It will thus be understood that a greater portion of the input light can be utilized for scanning the document without impairing the resolving power with the use of the prism-shaped fiber optics element. This is partly because the light projected to the document spreads thereon at a reduced area and partly because the light emitted from the fibers is effectively directed toward the document, through the provision of an angle $\alpha$ to the output ends of the individual fibers whereby the directivity of the outgoing light is significantly intensified. In this instance, the resolving power may be increased to a considerably extent, if an optical fiber with a relatively small numerical aperture which provides increased directivity of the light.

Figure 5:
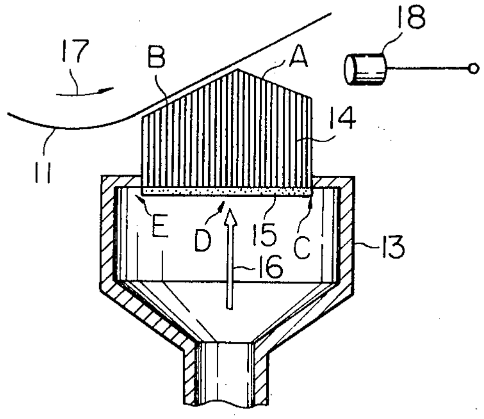
FIG. 5 is fragmentary sectional view of a cathode ray tube incorporated with a faceplate of the fiber optics element shown in FIGS. 1-*a* and 1-*b*.

Referring now to FIG. 5, there is shown a cathode ray tube 13 having a prism-shaped fiber optics faceplate 14 made of the fiber optics element above-described and a phosphorous layer 15 which is attached to the inner face of the faceplate 14. An electron beam designated by 16, which is generated in the cathode ray tube 13, is bombared onto the phosphorous layer 15 to form a flying spot on the phosphorous layer 15. The flying spot is transmitted through the faceplate 14 toward its end faces A and B. An information medium 11 carrying patterned information such as letters and symbols is positioned in close proximity to one of the slanting end faces A and B of the prism-shaped fiber optics faceplate 14. The information medium 11 is fed in a direction indicated by an arrow 17. The information medium 11 is thus swept by the flying spot linearly in a direction lateral to the advancing direction of the information medium 11.

When the apparatus of the invention is intended to operate as a read-out apparatus, the electron beam 18 is deflected within an area defined by lines C and D corresponding to the edges of the other slanting end face A. The electron beam 16 may be directed as closely to line D as possible. The flying spot formed by sweeping with the electron beam 16 is transmitted through the faceplate 14 and, at this slanting end face, the flying spot is focused and refracted toward the information medium 11. The flying spot reflected by the information medium 11 is picked up by the photoelectric converter and thereby converted into corresponding electric signals.

On the other hand, when the apparatus is intended to serve as a read-in apparatus, the electron beam 16 sweeps the phosphorous layer 15 within the area defined by lines D and E corresponding to the edges of the end face B.

Figure 6:
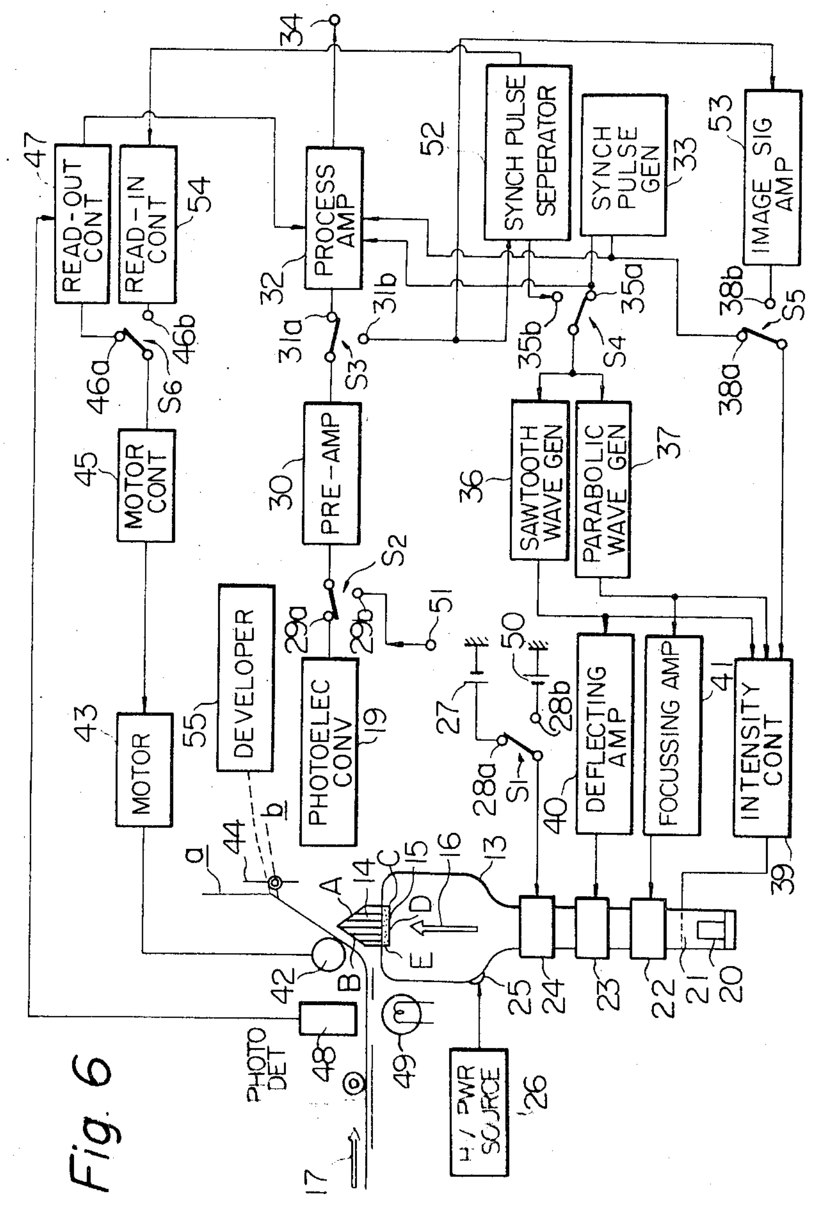
FIG. 6 is a schematic block diagram of an apparatus according to the invention.

A preferred embodiment of the apparatus according to the present invention using the cathode ray tube shown in FIG. 5 is schematically illustrated in FIG. 6. The apparatus comprises the cathode ray tube 13 having the prism-shaped fiber optics faceplate 14 as discussed with reference to FIGS. 5 and 6. The cathode ray tube 13 has, as customary, a cathode 20, a first control grid 21, a focusing element 22, a horizontal deflecting element 23, a vertical deflecting element 24 and an accelerating electrode 25 connected to a high voltage power source 26. An electron beam 16 is bombarded onto a phosphorous laYer 15 to form a flying spot thereon.

When this apparatus is intended to serve as a read-out apparatus, change-over switches $S_1$, $S_2$, $S_3$, $S_4$, $S_5$ and $S_6$ are permitted to stay in normal position as illustrated in this figure. A positive terminal of a d-c power source 27 is therefore connected through a stationary contact of the switch $S_1$ to the vertical deflecting element 24 so that the electron beam vertically deflected to strike the area defined by the lines C and D, whereby the flying spot generated in the phosphorous layer 15 is emitted from the end face A toward the information medium 11. The flying spot emitted from the faceplate 14 is irradiated on the information medium 11 and reflected by the medium 11. The flying spot reflected from the information medium 11 is picked up by the photo-electric converter 19 which converts the intensity variation of the flying spot into an electric signal which accordingly representing the image information carried on the information medium 11. This electric signal is applied through a stationary contact 29*a* of the switch $S_2$ to a pre-amplifier 30. The output signal of the pre-amplifier 30 is applied through a stationary contact 31*a* of the switch $S_3$ to a process amplifier 32. The process amplifier 32 superposes the output signal upon a desired d-c voltage, mixes the output signal with a horizontal driving pulse signal and a horizontal blanking pulse signal delivered from a synchronizing pulse generator 33 and makes the output signal undergo $\gamma$-correction and aperture correction. The particular signal may inverted in polarity and modulated, if desired. Thereupon, the thus processed signal, namely, an image signal appears at an output terminal 34. The horizontal driving pulse signal from one output terminal of the synchronizing pulse generator 33 is applied through a stationary contact 35*a* of the switch $S_4$ to a sawtooth wave generator 36 and a parabolic wave generator 37. The horizontal blanking pulse signal from the other terminal of the synchronizing pulse generator 33 is applied through a stationary contact 38*a* of the switch $S_5$ to an intensity controller 39.

An output signal from the sawtooth wave generator 36 is applied to a deflecting amplifier 40 which them supplies an electric energy to the horizontal deflecting element 23 to deflect the electron beam 18 in the cathode ray tube 12. An output signal of the parabolic-wave generator 58 is applied to a focusing amplifier 41 which supplies to the focusing element 22 an electric energy on which the parabolic-wave is superposed for sharply focusing the electron beam 18 without blooming at its greatest deflection angle. Both the output signal of the sawtooth-wave generator 56 and the parabolic-wave generator 58 are applied to the intensity controller 64 to cause the electron beam to undergo shading correction through the first control grid 21. The linear sweep by the flying spot transversely scans the information medium 11 which is fed in front of the faceplate 14 by a drive capstan 42 which is forced to rotate by a motor 43 and which advances the information medium 11 toward a guide 44 which is now slanted in a direction *a*, so that the information medium 11 is introduced outside of the apparatus.

The motor 43 is controlled by a motor controller 45 which is connected through a contact 46*a* of the change-over switch $S_6$ to one output terminal of a read-out controller 47. An input terminal of the controller 47 is connected to an output terminal of a photodetector 48 which senses a condition in which light from a lamp 49 is shielded by the information medium 11. The other output terminal of the controller 47 is connected to the process amplifier 32. Therefore, the controller 47 permits the process amplifier 32 to become operative only when the information medium 11 is positioned in front of the faceplate 14 of the tube 13.

When this apparatus is intended to operate as a read-in apparatus, the movable contacts of the change-over switches $S_1$ through $S_6$ are all slanted to *b* side. A negative voltage of a d-c power source 50 is exerted on the vertical deflecting element 24 through a stationary contact 28*b* of the switch $S_1$, so that the electron beam vertically deflected to strike the area of the phosphorous layer 16 defined by the lines D and E. The flying spot generated in the area is transmitted through the faceplate 14 and emitted from the end face B with the result that the flying spot is irradiated on the information medium 11. The information medium 11 should, in this case, photo-sensitive and capable of recording an image or pattern carried by the flying spot form the cathode ray tube 13. An image signal bearing an image information is, on the other hand, applied to an signal receiving terminal 51. The image signal is applied through a stationary contact 29*b* of the switch $S_2$ to the pre-amplifier 30. The image signal passed through the pre-amplifier 30 is applied through a stationary contact 31*b* of the switch $S_3$ to a synchronizing pulse separator 52 and a image signal amplifier 53. Synchronizing pulse separated from the received image signal by the separator 52 is applied to the sawtooth-wave generator 36 and parabolic-wave generator 37 through a contact 60*b* of the switch $S_4$. An output of the image signal amplifier 53 is applied to the intensity controller 64 through a contact 38*b* of the switch $S_5$ to modulate the intensity of the electron beam of the tube 13 through the first grid 21. The synchronizing pulse from the separator 52 is also applied to a read-in controller 54 which synchronizes the feeding rate of the information medium 11 by the capstan 42 with the sweep rate of the cathode ray tube 13 through a contact 46*b* of a change-over switch $S_6$ and the motor controller 45. The information medium 11 is introduced into a developer 55 by the guide 44 which is now slanted to *b* side and visual image information is developed on the information medium 11 which is carried by the received image signal.

It will be appreciated that the apparatus hereinabove described is characterized by the capability of reading out information on a usual information medium which includes even an opaque information medium. Also, the apparatus has a great resolving power and decreased loss of light due to the use of the prism-shaped fiber optics faceplate.

Furthermore, the apparatus according to the invention can be readily changed its read-in function to read-out function, and vice versa, through a simple procedure.

It will be understood that the invention is not to be limited to the exact construction shown and described and that various changes and modifications may be made without departing from the spirit and scope of the invention, as defined in the appended claims.

What is claimed is:

1. A read-in and read-out apparatus for a facsimile system, which comprises:

a cathode ray tube having a prism-shaped fiber optics faceplate having a phosphorous layer on the inner surface thereof;

feeding means for advancing an information medium closely adjacent to one of the slanting end faces of said prism-shaped fiber optics faceplate;

read-out control means for controlling said cathode ray tube to produce an electron beam which scans an area of said phosphorous layer corresponding to the other of said slanting end faces so as to cause a flying-spot to appear in said layer and to be irradiated through the other end face on to said information medium;

read-out means for picking up the flying spot reflected from said information medium and converting intensity variations of the flying spot into an electric signal having an instantaneous magnitude substantially proportional to the intensity of the flying spot;

read-in control means for receiving an image signal bearing an image and for controlling said cathode ray tube to produce an electron beam which is intensity-modulated in accordance with said image signal and aligned to strike an area of the phosphorous layer corresponding to the one slanting end face so as to cause a flying spot having intensity proportional to that of said electron beam to emit from said one slanting end face and irradiate on said information medium;

read-in means for processing the information medium irradiated with said flying spot; and switch means to selectively operate said read-out control and read-out means, and read-in control and read-in means.

* * * * *